United States Patent [19]

Desai

[11] 4,204,994
[45] May 27, 1980

[54] AZOANILINO-TOLUENE SULFONAMIDOALKYLENEAMINE CATIONIC DISAZO DYES FOR PAPER

[75] Inventor: Kishor A. Desai, Lock Haven, Pa.

[73] Assignee: American Color & Chemical Corporation, Charlotte, N.C.

[21] Appl. No.: 4,442

[22] Filed: Jan. 18, 1979

[51] Int. Cl.² ............................................. C09B 31/02
[52] U.S. Cl. ................... 260/174; 260/177; 260/184; 260/186; 260/156
[58] Field of Search ............... 260/174, 177, 184, 186, 260/156

[56] References Cited

U.S. PATENT DOCUMENTS

| | | | |
|---|---|---|---|
| 3,709,870 | 1/1973 | Wolfrum | 260/174 |
| 3,881,866 | 5/1975 | Renfrew | 260/158 |
| 3,933,787 | 1/1976 | Moser | 260/156 |

OTHER PUBLICATIONS

Wallace et al., Chem. Abst. 69 (1968), #107600x.

*Primary Examiner*—Arthur P. Demers
*Attorney, Agent, or Firm*—Armstrong, Nikaido, Marmelstein & Kubovcik

[57] ABSTRACT

Cationic disazo dyes useful for dyeing paper pulp and characterized by outstanding affinity for paper pulp, both under waterleaf and sized dyeing conditions, are provided. The dyes have the structural formula:

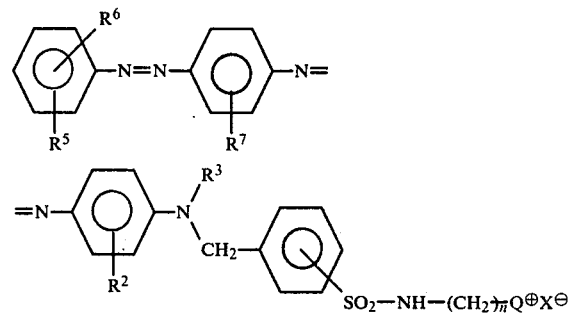

wherein $R^5$, $R^6$, $R^7$, $R^2$, $R^3$, n, Q and X are specifically defined.

2 Claims, No Drawings

AZOANILINO-TOLUENE SULFONAMIDOALKYLENEAMINE CATIONIC DISAZO DYES FOR PAPER

BACKGROUND OF THE INVENTION

1. Field of the Invention

This invention relates to azo dyes and more particularly, to reddish yellow cationic disazo dyes characterized by their strong affinity for paper pulp.

2. Description of the Prior Art

Direct dyes for paper are well-known. Many of these dyes, however, when employed in conventional processes for dyeing paper, because of inadequate affinity for paper pulp, produce so-called white water containing environmentally significant amounts of the dyes. Ordinarily, the color must be destroyed before the white water can be discharged as effluent. The treatment of the white water is an additional and undesirable expense in the dyeing of paper.

There is, therefore, a great need for dyes for paper which have sufficient affinity for paper pulp such that the cost of treatment of white water is reduced or eliminated.

It has now been found according to the present invention that certain cationic disazo dyes derived from an aminoazobenzene base and an anilino-toluene sulfonamidoalkyleneamine coupler have excellent affinity for paper pulp under both sized and waterleaf dyeing conditions. These dyes enable the paper to be dyed even in heavy shades without any appreciable loss of dye in the white water. There is practically no dye left in the white water. The dyes also have fair to good fastness to acid, alkali and chlorine.

The coupler of the cationic disazo dyes according to the present invention is disclosed in Renfrew, U.S. Pat. No. 3,881,866. The quaternary azo dyes of Renfrew are disclosed as having utility in the dyeing of acrylic fibers.

SUMMARY OF THE INVENTION

In accordance with the present invention there are provided disazo dyes of the general structural formula:

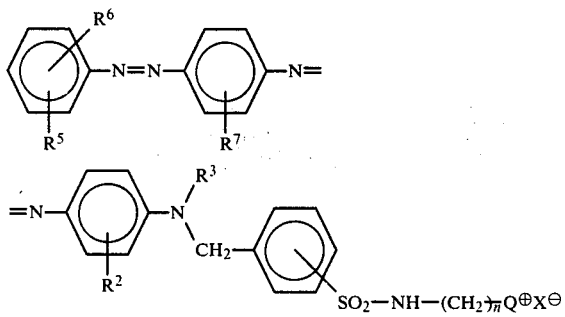

wherein $R^2$ is H, lower alkyl, lower alkoxy, chloro or bromo;
$R^3$ is lower alkyl or cyano lower alkyl;
$R^5$ and $R^6$ are independently H, chloro, bromo, lower alkyl, lower alkoxy or N,N-di(lower alkyl) sulfonamido ($NR_2SO_2$—);
$R^7$ is H, lower alkyl, lower alkoxy, chloro or bromo;
n is an integer of 2-4;
Q is $N(R^4)_3$, where $R^4$ is lower alkyl, or is

X is an anion, preferably, chloro, bromo, methosulfate, ethosulfate, or methanesulfate.

As used herein the term "lower" is intended to refer to groups containing 1–4 carbon atoms.

DESCRIPTION OF PREFERRED EMBODIMENTS

The disazo dyes according to the present invention may be prepared according to procedures well-known in the art by diazotizing an aminoazobenzene of the formula (I):

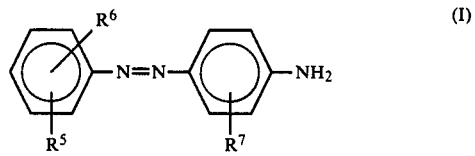

wherein $R^5$, $R^6$ and $R^7$ are as defined above; and adding the diazonium salt to a cold aqueous solution of the appropriate coupling component.

The aminoazobenzenes of formula (I) are themselves known and can be prepared according to conventional procedures. A preferred base is p-aminoazobenzene.

The couplers useful in preparing the cationic azo dyes according to the present invention can be prepared by the procedures described in Columns 3 and 4 of Renfrew, U.S. Pat. No. 3,881,866. These procedures are incorporated herein by reference. Generally, the couplers are synthesized by chlorosulfonation of N-alkyl-N-phenylbenzylamine followed by reaction with an N,N-dialkylalkylenediamine or an aminoalkylenechloride having 2–4 carbon atoms in their alkylene chains. Quaternization is accomplished by reacting with alkylating agents or pyridine. A preferred coupling component is 1,1,1-trimethyl-1-[2-{α-(N-ethylanilino)-m-toluenesulfonamido}-ethyl]ammonium methane sulfonate. This coupler may be prepared by a procedure analogous to that of Example 3 of Renfrew.

The cationic disazo dyes according to the present invention are made by the reaction of the diazotized base with the cationic coupler by adding the diazonium salt to a cold aqueous solution of the coupler. A buffering agent, such as sodium acetate, is added to maintain a pH of 5 to 7, preferably about 5.5. The mixture is allowed to react for about 16 hours at room temperature. The dye is isolated by concentration and cooling.

The disazo dyes according to the present invention prepared according to the above-described procedures are used to dye paper stock according to conventional procedures by dissolving the dyes in water or mixtures of water and acetic acid. The dyes show outstanding affinity for paper pulp under both waterleaf and sized dyeing conditions and dye paper in reddish yellow shades which exhibit outstanding water bleedfastness and good acid, alkali and chlorine fastness properties.

The invention is further illustrated in the following examples.

EXAMPLE I

Preparation of the Compound:

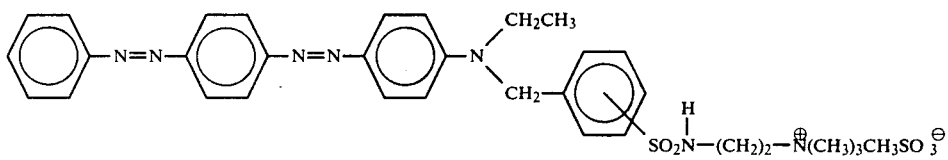

To a one liter beaker, there were added with constant mechanical stirring:
47.9 parts 32% (concentrated) hydrochloric acid
70 parts ice
250 parts water and
82.8 parts p-aminoazobenzene.
To this solution were added:
72.4 parts 32% hydrochloric acid and
105 parts water.
After stirring for 10 minutes there were added slowly:
29 parts sodium nitrite dissolved in
50 parts water.

The solution was stirred at 5–10° C. for 2½ hours. It was then filtered and the filtrate used further. The above diazonium solution was added to a 2 liter beaker containing
197.8 parts 1,1,1-trimethyl-1-[2-{α-(N-ethylanilino) -m-toluenesulfonamido}-ethyl]-ammonium methane sulfate dissolved in
600 parts water and
200 parts ice.
The solution was stirred at 5°–10° C. for two hours. The pH of the solution was raised to 5.5 by the addition of a saturated solution of sodium acetae. It was then stirred for 12 hours at 5°–20° C. The product was isolated by concentration and cooling. It was filtered off, dried in an oven at 75° C. The yield was 225.3 grams.

EXAMPLES II–V

Following the procedures of Example I and employing the appropriate base and coupler, cationic disazo dyes according to the present invention, wherein $R^5$, $R^6$ $R^7$, $R^2$ and $R^3$ are as shown below, may be prepared:

| Example No. | $R^5$ | $R^6$ | $R^7$ | $R^2$ | $R^3$ |
|---|---|---|---|---|---|
| II | H | CH$_3$ | CH$_3$ | H | CH$_2$CH$_3$ |
| III | H | CH$_3$ | CH$_3$ | CH$_3$ | CH$_2$CH$_3$ |
| IV | H | CH$_3$ | CH$_3$ | H | CH$_3$ |
| V | H | CH$_3$ | CH$_3$ | CH$_3$ | CH$_3$ |

The dyes of these examples will also show outstanding affinity in the dyeing of paper.

Although the invention has been described in conjunction with certain preferred embodiment, it is not intended to be limited thereto but, instead, includes all those embodiments within the scope and spirit of the appended claims.

What is claimed is:

1. A cationic disazo dye characterized by outstanding affinity for paper pulp and having the structural formula:

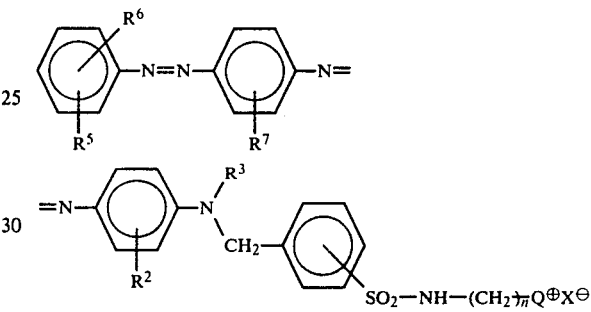

wherein
$R^2$ is H, lower alkyl, lower alkoxy, chloro or bromo;
$R^3$ is lower alkyl or cyano lower alkyl;
$R^5$ and $R^6$ are independently H, chloro, bromo, lower alkyl, lower alkoxy or N,N-di(lower alkyl)sulfonamido;
$R^7$ is H, lower alkyl, lower alkoxy, chloro or bromo;
n is an integer of 2–4;
Q is N(R$^4$)$_3$, where $R^4$ is lower alkyl, or is

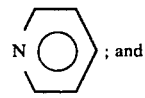 ; and

X is chloro, bromo, methosulfate, ethosulfate or methanesulfate.

2. A cationic disazo dye of the structural formula:

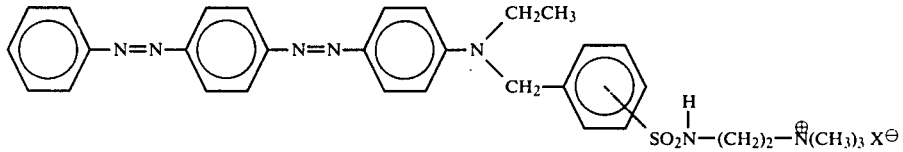

where X is as defined in claim 1.